United States Patent
Li

(12) United States Patent (10) Patent No.: US 7,715,443 B1
Li (45) Date of Patent: May 11, 2010

(54) BOUNDARY PROCESSING BETWEEN A SYNCHRONOUS NETWORK AND A PLESIOCHRONOUS NETWORK

(75) Inventor: Kam-Wing Li, Petaluma, CA (US)

(73) Assignee: Meriton Networks US Inc., Wilmington, DE (US)

( * ) Notice: Subject to any disclaimer, the term of this patent is extended or adjusted under 35 U.S.C. 154(b) by 1072 days.

(21) Appl. No.: 10/728,657

(22) Filed: Dec. 5, 2003

(51) Int. Cl.
H04J 3/07 (2006.01)
H04L 25/00 (2006.01)
H04L 7/00 (2006.01)

(52) U.S. Cl. ................ 370/505; 370/907; 375/363; 375/372

(58) Field of Classification Search ........... 370/503, 370/505, 506, 518, 465–466, 535–537, 372–373, 370/376, 362–363
See application file for complete search history.

(56) References Cited

U.S. PATENT DOCUMENTS

| | | | |
|---|---|---|---|
| 5,131,013 A * | 7/1992 | Choi | 375/372 |
| 5,200,982 A * | 4/1993 | Weeber | 375/372 |
| 5,337,334 A * | 8/1994 | Molloy | 375/372 |
| 5,959,996 A | 9/1999 | Byers | |
| 6,751,239 B2 | 6/2004 | Raman et al. | |
| 6,754,174 B1 | 6/2004 | Ben-Zur et al. | |
| 6,798,779 B1 | 9/2004 | Shimbashi et al. | |
| 6,868,066 B1 | 3/2005 | Fujita | |
| 7,227,876 B1 * | 6/2007 | Cochran et al. | 370/509 |
| 2001/0012288 A1 | 8/2001 | Yu | |
| 2002/0090006 A1 | 7/2002 | Chang et al. | |
| 2002/0191724 A1 * | 12/2002 | Bleisteiner et al. | 375/372 |
| 2003/0043810 A1 | 3/2003 | Boduch et al. | |
| 2004/0120360 A1 * | 6/2004 | Tanis et al. | 370/538 |

* cited by examiner

*Primary Examiner*—Nittaya Juntima
(74) *Attorney, Agent, or Firm*—Mayer & Williams PC

(57) ABSTRACT

The techniques described herein allow a more efficient transmuxing operation for transferring data from a synchronous domain (e.g., SONET) to a plesiochronous (e.g., PDH) domain as compared to the prior art, in which extraction of data streams, jitter filtering and stuff bit generation are processed separately. The techniques described herein include extraction of data from the plesiochronous data stream without complete extraction of the underlying native data stream. Filtering is performed based on synchronous timing, which results in a simpler filter design.

20 Claims, 6 Drawing Sheets

BOUNDARY PROCESSING BETWEEN A SYNCHRONOUS NETWORK AND A PLESIOCHRONOUS NETWORK

TECHNICAL FIELD

The invention relates to telecommunication networks. More particularly, the invention relates to translation of data signals between a synchronous network (e.g., SONET, SDH) and a plesiochronous network (e.g., PDH).

BACKGROUND

Historically, voice communications systems have been based on a plesiochronous digital hierarchy (PDH) in which transmitting devices and receiving devices nominally operate at the same rate, but the transmitting and receiving devices may not be perfectly synchronized. In North America, the PDH includes 64 kbps (DS0), 1.544 Mbps (DS1), 6.312 Mbps (DS2) and 44.736 Mbps (DS3) signals. Signals used in Europe and Japan are slightly different.

Service providers are increasingly using synchronous optical network (SONET) equipment to transmit data using fiber optic technologies. Various components of the SONET and PDH standards are described in Telcordia Technologies, "Synchronous Optical Network (SONET) Transport System: Common Generic Requirements, GR-253-core," Issue 3, September 2000, Telcordia Technologies, "Transport System Generic Requirements (TSGR): Common Requirements GR-499-core," Issue 2, December 1998, and American National Standards Institute (ANSI) T1.105.03, "Synchronous Optical Network (SONET): Jitter at Network Interfaces," 1994.

Increasing use of SONET equipment results in integration of PDH and SONET networks. This integration can result in situations in which PDH traffic is carried by SONET equipment where processing (e.g., multiplexing) of signal is performed on PDH signals. Various techniques have been developed to perform these operations. However, some current techniques are inefficient.

SUMMARY

Data is extracted from a data stream formatted according to a first network protocol. The extracted data is stored in a buffer based on a first timing signal associated with the data stream. The extracted data is read from the buffer based on a second timing signal associated with a second network protocol. Stuff bits are generated for a data stream according to the second network protocol based on a phase difference between the first timing signal and the second timing signal.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Conversion between PDH and SONET signaling protocols with associated multiplexing or demultiplexing of PDH signals is often referred to as "transmultiplexing" or "transmuxing" for short. However, the term "transmux" have been used to refer to many combinations of mapping and multiplexing. As used herein, "transmultiplexing" or "transmuxing" or a "transmux" operation refers specifically to "M13 transmultiplexing," which has been used in literature (e.g., FLASH-WAVE 4300 Integrated M13 Transmux Applications," Fujitsu Network Communications, Inc., March, 2002) to refer to the following processes: Ingress transmuxing (STS-1 to DS3 to DS1 to VT1.5) and Egress transmuxing (VT1.5 to DS1 to DS3 to STS-1).

Each step in the transmuxing process involves mapping/demapping, multiplexing/demultiplexing and/or framing of a data stream. These steps convert data from one format to another, extract or generate overhead data, etc. The techniques described herein allow an efficient transmuxing operation for transferring data from a synchronous domain (e.g., SONET) to a plesiochronous (e.g., PDH) domain, in which jitter filtering and stuff bit generation are merged. The techniques described herein include extraction of data from the plesiochronous data stream without complete extraction of the underlying native data stream. Filtering is performed based on synchronous timing, which results in a simpler filter design. As described in greater detail below, a simpler and more efficient filter design (as compared to the prior art) can be achieved by merging the jitter filtering operation at the synchronous-to-plesiochronous boundary with the plesiochronous bit stuffing process.

Figure 1:
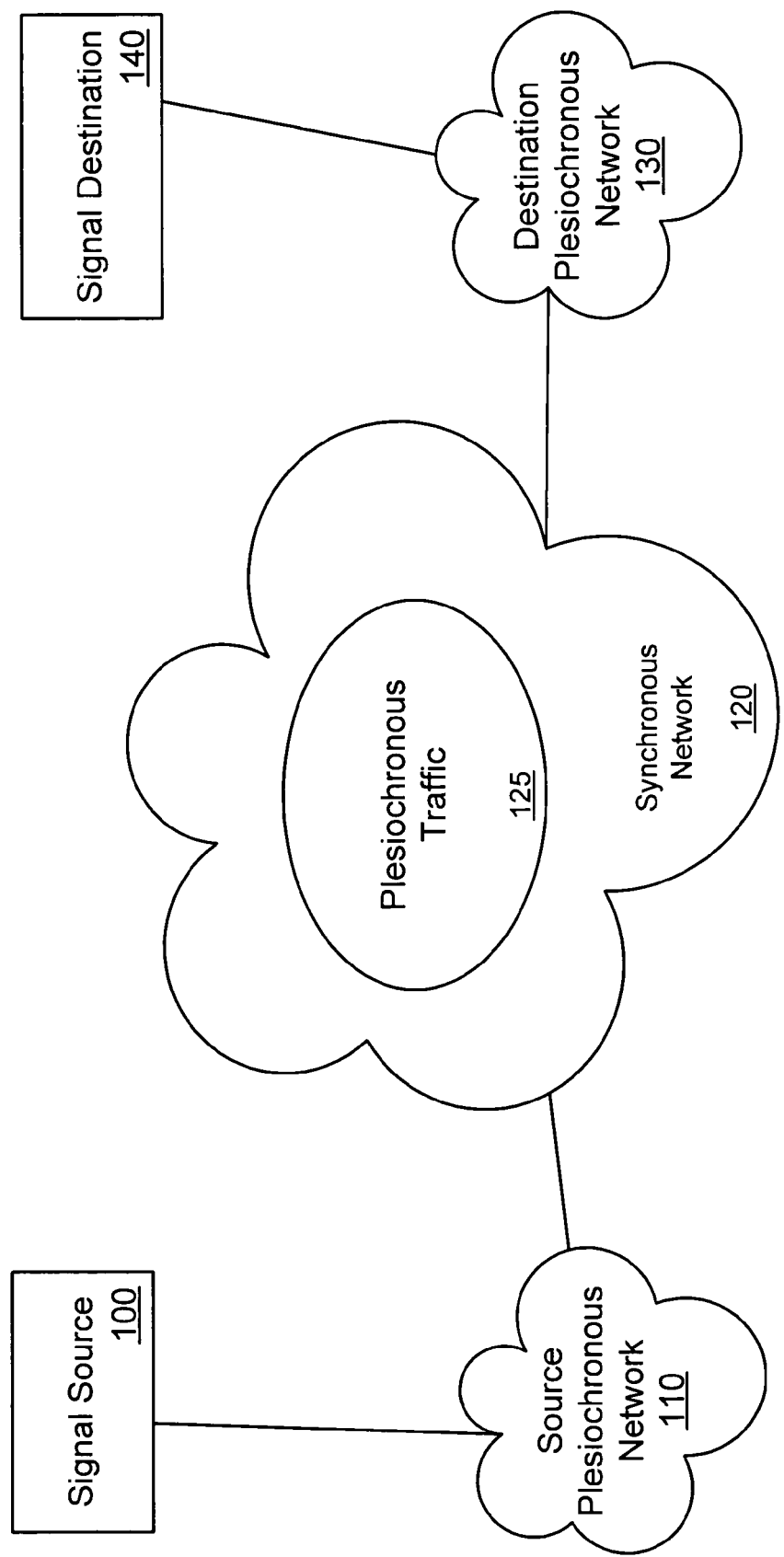
FIG. 1 is a conceptual diagram of a network configuration having synchronous and plesiochronous network components.

FIG. 1 is a conceptual diagram of a network configuration having synchronous and plesiochronous network components. The examples provided below are described in terms of a plesiochronous stream carrying a voice signal; however, the content of the plesiochronous stream is not relevant to the technique used for transmuxing.

Signal source 100 generates a plesiochronous signal that is carried by source plesiochronous network 110. For example, signal source 100 can be a telephone that transmits a signal over a voice frequency (VF) channel. The VF channel corresponding to signal source 100 can be combined with other VF channels that are carried by source plesiochronous network 110 as a DS1 signal. Further signal aggregation is also possible.

The plesiochronous signal from signal source 100 is transmitted from source plesiochronous network 110 to destination plesiochronous network 130 by synchronous network 120. Destination plesiochronous network 130 carries the signal to signal destination 140, which can be, for example, a telephone. If, during the time that synchronous network 120 carries the plesiochronous signal (labeled plesiochronous traffic 125), a multiplexing or demultiplexing operation is to be performed, a transmuxing operation is required.

The techniques described herein are directed to the synchronous-to-plesiochronous transmuxing operation. The examples that follow are described in terms of de-mapping a VT1.5 signal to a DS1 which is then multiplexed to a DS2 or a DS3 signal; however, other transmuxing operations can also be supported. The transmuxing techniques described herein in terms of SONET and PDH signal formats are equally applicable to other synchronous (e.g., SDH) and plesiochronous (e.g., CEPT) signal hierarchies.

Figure 2:
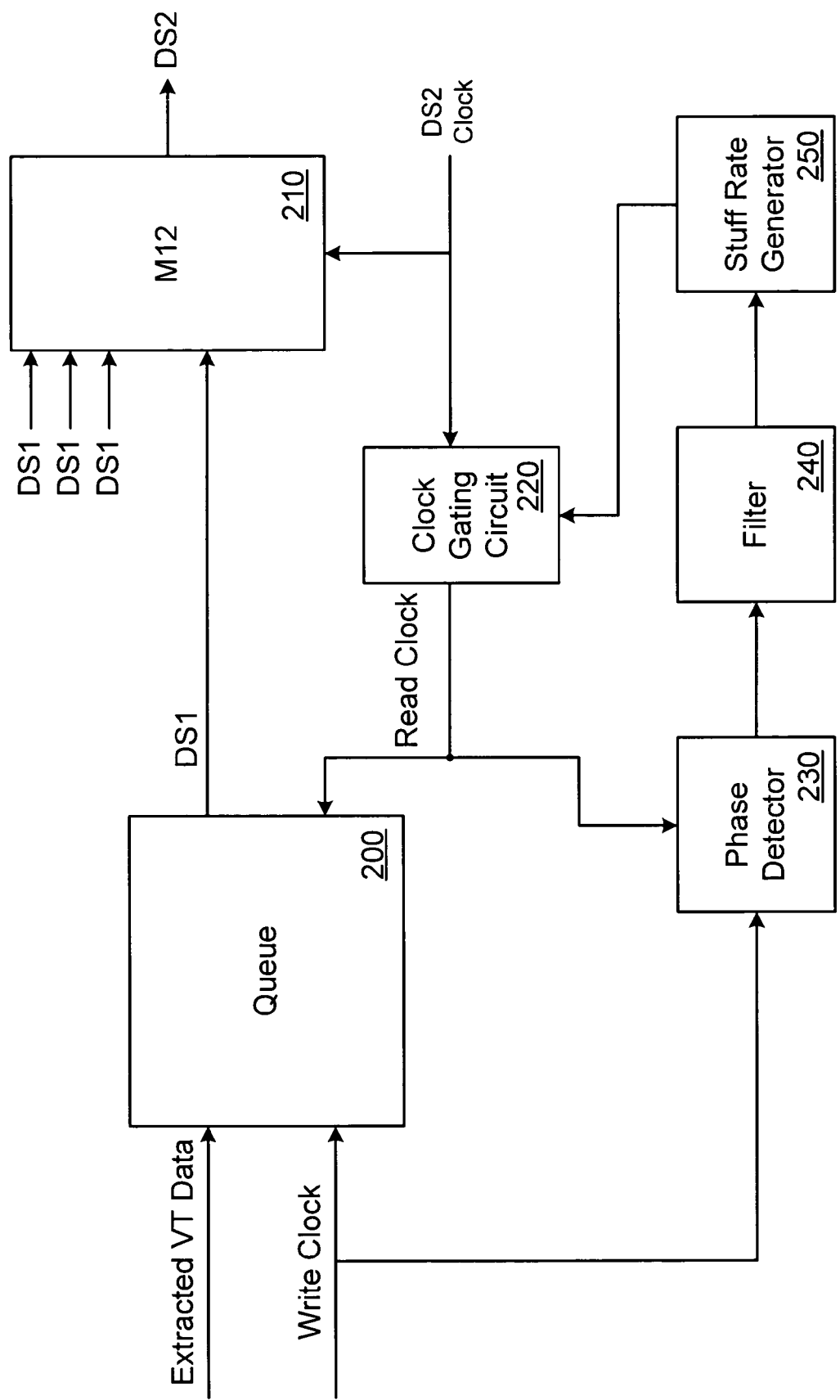
FIG. 2 is a block diagram of one embodiment of jitter filter components for use in a synchronous-to-plesiochronous transmultiplexing operation.

FIG. 2 is a block diagram of one embodiment of jitter filter components for use in a synchronous-to-plesiochronous transmultiplexing operation. One of the complications of the transmuxing process is that, although all DSn signals may be internal to a particular network element, each signal must meet jitter requirements for each level of translation and/or multiplexing. As a result, the following jitter attenuation is made in the ingress path: STS-1 pointer adjustment jitter (byte de-stuffing), STS-1 to DS3 de-mapping jitter (including bit de-stuffing jitter), DS3 to DS1 demultiplexing jitter (bit de-stuffing) and DS1 to VT1.5 mapping jitter (bit stuffing). In the egress path, the following jitter adjustments must be made: VT1.5 pointer adjustment jitter (byte de-stuffing), VT1.5 to DS1 de-mapping jitter (including bit de-stuffing jitter), DS1 to DS3 multiplexing jitter (bit stuffing), and DS3 to STS-1 jitter (bit stuffing).

In one embodiment, for ingress traffic, the various jitters can be compensated for collectively at the DS1 to VT1.5 mapping stage. In the egress direction, jitters are compensated for at the VT1.5 de-mapping stage and at the DS3 mapping stage.

Jitter filtering is performed on DS1 data streams that are extracted from VT1.5 data streams without transforming the VT1.5 data stream to a standard DS1 format. That is, the payload from a VT1.5 data stream that corresponds to a DS1 data stream is used directly without a full conversion from VT1.5 format to DS1 format. This allows for a more compact filter design as compared to a full format conversion prior to filtering. Described below are circuits and techniques for smoothing jitter arising from VT1.5 pointer adjustment and VT1.5 de-mapping in the egress transmuxing process. Other jitters can be smoothed in a similar manner.

When data streams based on different clock signals are combined (e.g., multiplexed or mapped), synchronization is required. Synchronization is typically achieved by either bit or byte stuffing, which embeds the lower rate clock signal into the higher rate data stream. Overhead bits may be added during synchronization. The destination device that receives the combined data stream removes the stuff bits as well as the overhead bits (if any). However, clock timing information, which is an analog quantity, is susceptible to noise that is introduced by the conversion process (e.g., stuffing). This noise causes clock jitter and wander (low frequency jitter).

Conceptually, there are two operations involved in the bit stuffing process. The first operation is the insertions of stuff bits in the higher rate data stream. The second operation is the filtering of jitter and wander, which has conventionally been performed either before the stuffing process and/or by a destination device.

Prior art transmuxing techniques transform the synchronous signal to a plesiochronous signal, upon which jitter filtering is performed as separate operations prior to bit stuffing used to form higher-order PDH signals. Logically, this is the simplest technique because data is extracted, reformatted and then timing corrections are made. However, this is also a more bandwidth intensive approach.

A simpler and more bandwidth efficient transmux design can be achieved by merging the jitter filtering operation at the synchronous-to-plesiochronous boundary with the plesiochronous bit stuffing process. As described in greater detail below, the components of FIG. 2 allow both operations to be combined in a single process.

Referring to FIG. 2, extracted DS1 data is stored in queue 200 according to the write clock signal. In one embodiment, the write clock signal is a SONET clock signal from the VT1.5 data stream from which the DS1 data has been extracted. Because SONET signals are transmitted as frames having multiple streams (VTs), the write clock signal provided to queue 200 is referred to as a "gapped" SONET clock. Thus, the data that is written to queue 220 is temporally uneven, or bursty.

In one embodiment, queue 200 supports a single VT to DS1 conversion. In alternate embodiments, other queue structures can be used to support multiple parallel conversions. In one embodiment, queue 200 is a first-in/first-out (FIFO) queue; however, other buffering or queue structures can also be used.

Data is read from queue 200 according to the read clock provided by clock gating circuit 220. In general the read clock is a DS1 clock signal corresponding to the output DS1 data stream. As described in greater detail below, clock gating circuit 220 is used for regulation of bit stuffing as well as for providing the read clock signal. The read clock signal is a generally evenly spaced clock signal at approximately one quarter of the DS2 data rate; however, the data may have gaps based on bit stuffing.

Data is written to and read from queue 200 at the same nominal rate. However, data is written to queue 200 at a rate that is uneven over a SONET frame time period. Data is read from queue 200 at a rate that is generally even, with some compensation for plesiochronous clock signal differences, over a SONET frame time period. Thus, the amount of data stored in queue 200 varies over a SONET frame time period.

The DS1 formatted data stream as output from queue 200 can be combined with other DS1 data streams to generate a DS2 data stream using DS1 to DS2 multiplexor (M12) 210. Techniques and devices for aggregating multiple DS1 data streams into a DS2 data stream are known in the art. Further aggregation can provide a DS3 level plesiochronous signal.

Phase detector 230 is coupled to receive the write clock signal and the read clock signal and to determine a phase difference between the two clock signals. Phase detector 230 generates an output signal indicating the phase difference between the read clock signal and the write clock signal. The phase difference is indicative of the amount of data stored in queue 200.

In one embodiment, filter 240 implements a bit-leaking algorithm that spreads out phase jitters associated with individual VT1.5 pointer adjustment (byte de-stuffing) events as well as operating as a synchronous digital filter (or an integrate-and-dump filter) that removes changes (noise) that have a frequency of 2n kHz, where "n"=1, 2, 3, . . . . The two components operate essentially independently. In one embodiment, the 2 kHz scaling factor of the synchronous digital filter arises as a result of the fact that the filter operates on individual VT "superframes" that includes four VT1.5 frames embedded in four corresponding STS-1 frames. Other scaling factors will result if the filter is chosen to operate on other numbers of VT superframes. Continuing with the 2 kHz scaling factor example, each VT frame corresponds to a 125 µs window, and 4 VT frames corresponds to a 500 µs window, which corresponds to 2 kHz. In alternate embodiments, the 2 kHz scaling factor can be reduced to, for example, 1 kHz, 500 Hz, and so on, by using an average over two or more superframes.

The purpose of jitter filtering is to remove as much noise (both jitter and wander) as possible from the clock timing signal. The filtering process is based on the fact that the clock signal timing is stable and only varies within a small and predefined range, and that there are standards that govern the stability of the timing signals. As a result, the spectral content of the clock signal around the nominal frequency should be small. Thus, a narrow-band bandpass filter centered around the expected clock frequency can remove much of the jitter and wander. However, whether the bandpass filter can provide sufficient filtering depends upon the in-band noise, which is a function of the stuff ratio.

Figure 3:
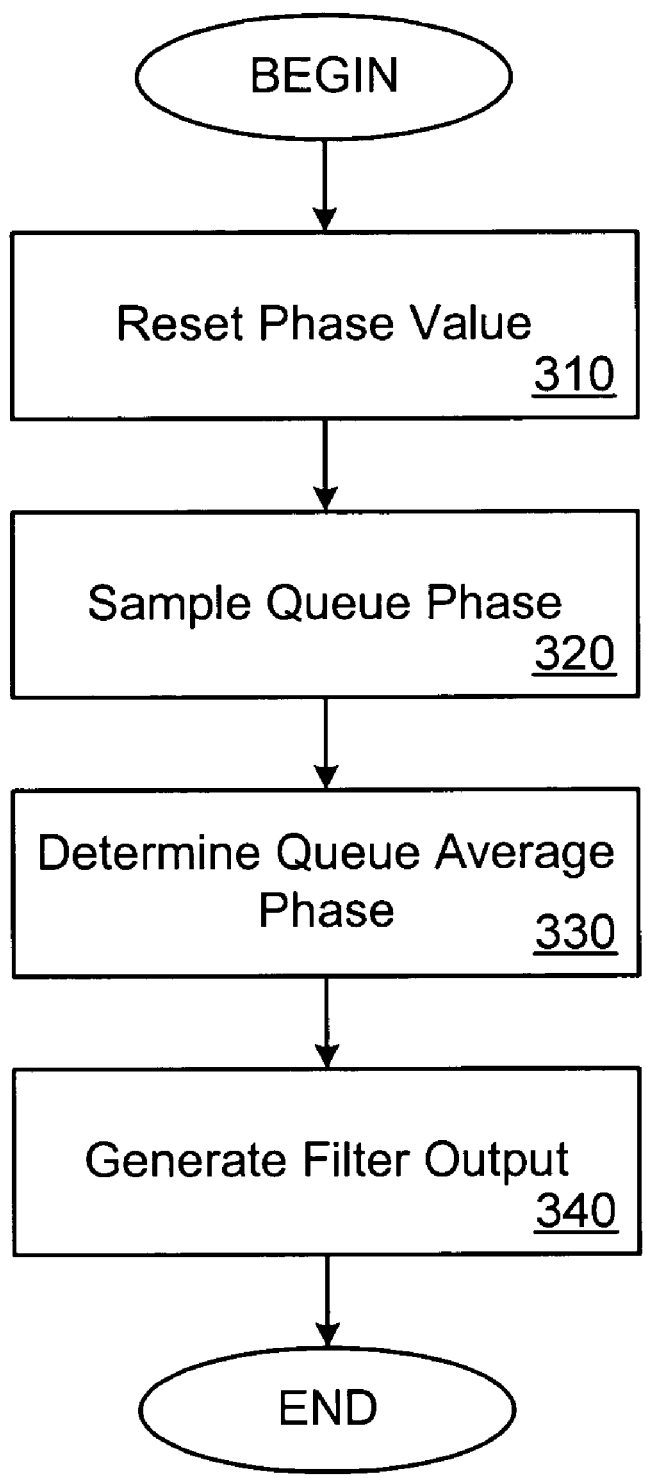
FIG. 3 is a flow diagram of one embodiment of filter operation using a 2 kHz scaling factor.

FIG. 3 is a flow diagram of one embodiment of filter operation using a 2 kHz scaling factor. The phase value is reset, 310. In one embodiment, at the beginning of a VT superframe, the phase value is reset to 0. In alternate embodiments, the phase value can be reset at times other than at the beginning of a VT superframe. The phase value can also be set to a predetermined value other than 0. When averaging multiple VT superframes, the phase value is reset at the beginning of the group of VT superframes for which an average is to be determined.

In one embodiment, the queue phase is sampled at a predetermined rate, 320. In alternate embodiments, the sampling rate can be varied, for example, dynamically or according to a pattern. That is, the amount of data stored in the queue is sampled at a predetermined frequency. In one embodiment, the queue phase is sampled "n" (e.g., 48 times per VT frame, or 192 times per VT superframe) times per frame. Other sampling rates can also be used based on considerations known in the art, for example, to avoid aliasing.

The average queue phase is determined, 330. Using the sample above, the sum of the 192 queue phase values is divided by 192 to determine an average queue phase value. Alternative, techniques for determining the average queue phase can also be used. The average queue phase is used as the filter output, 340. The process of FIG. 3 can be repeated as necessary, for example, every 500 µs for a stream of VT superframes.

Figure 4:
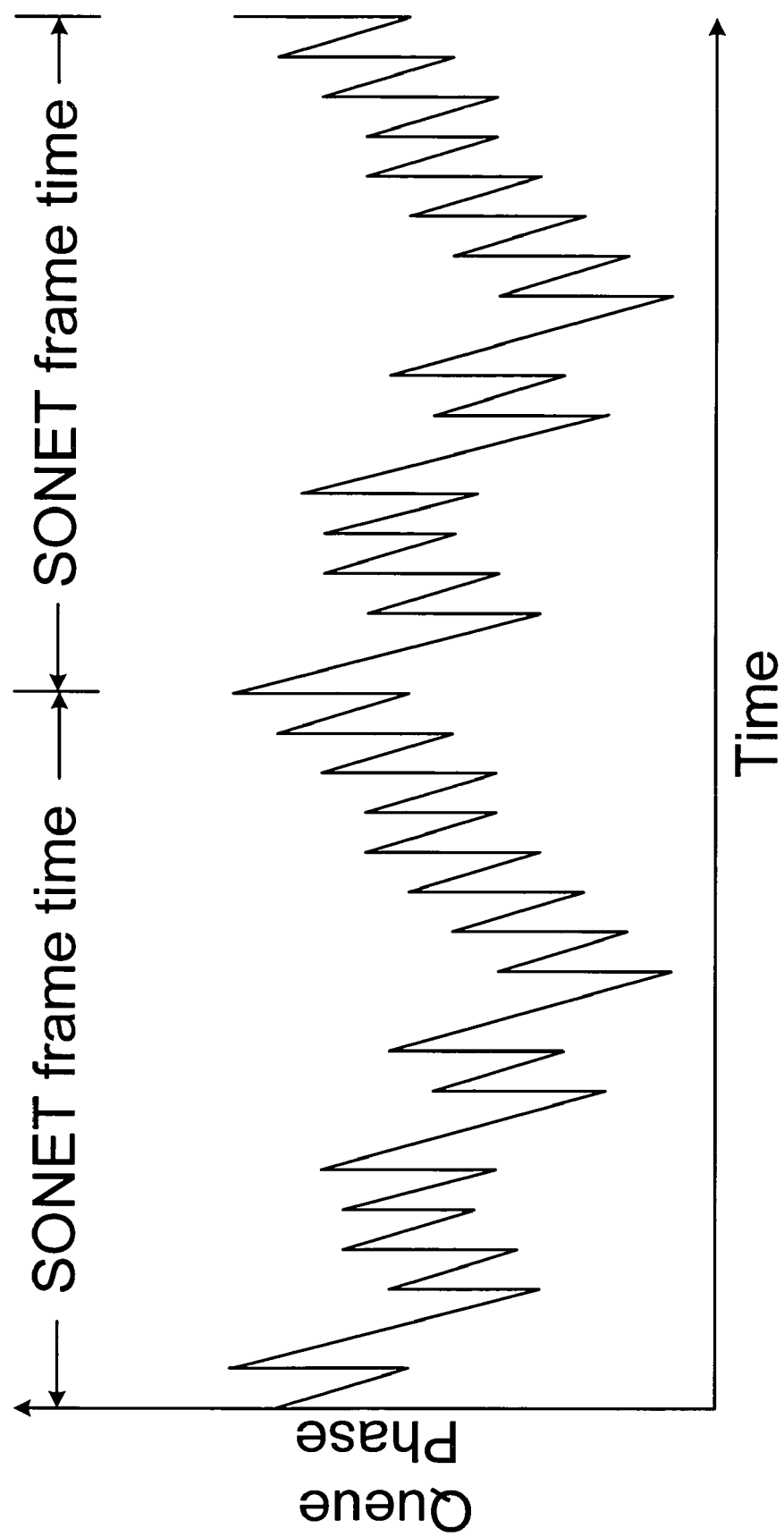
FIG. 4 is a phase versus time diagram corresponding to the input of a filter for use in a synchronous-to-plesiochronous transmultiplexing operation.

FIG. 4 is a phase versus time diagram corresponding to the input of a filter for use in a synchronous-to-plesiochronous transmultiplexing operation. As a DS1 data is demapped from the VT1.5 data stream, the burstiness and uneven nature of the embedded data results in fluctuations in the queue phase, as illustrated in FIG. 3. This fluctuation is generally periodic in the synchronous (e.g., SONET) domain, but appears random in the plesiochronous domain. As a result, if the phase signal is filtered based on plesiochronous timing, the filter is required to remove more random noise than if filtered in the synchronous domain.

Returning to FIG. 2, the output of filter 240 is a sequence of filtered queue phase values. The filtered phase values are converted (mapped), linearly or non-linearly, to a stuff rate by stuff rate generator 250. The conversion can be accomplished, for example, either through a lookup table or by calculation.

Figure 5B:
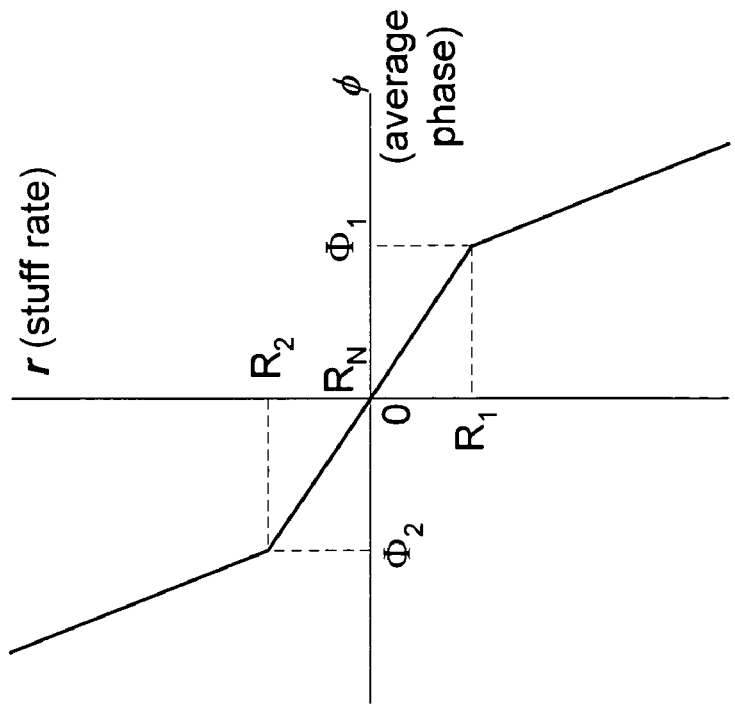
FIG. 5b graphically illustrates one embodiment of a piece-wise linear stuff rate mapping.
Figure 5A:
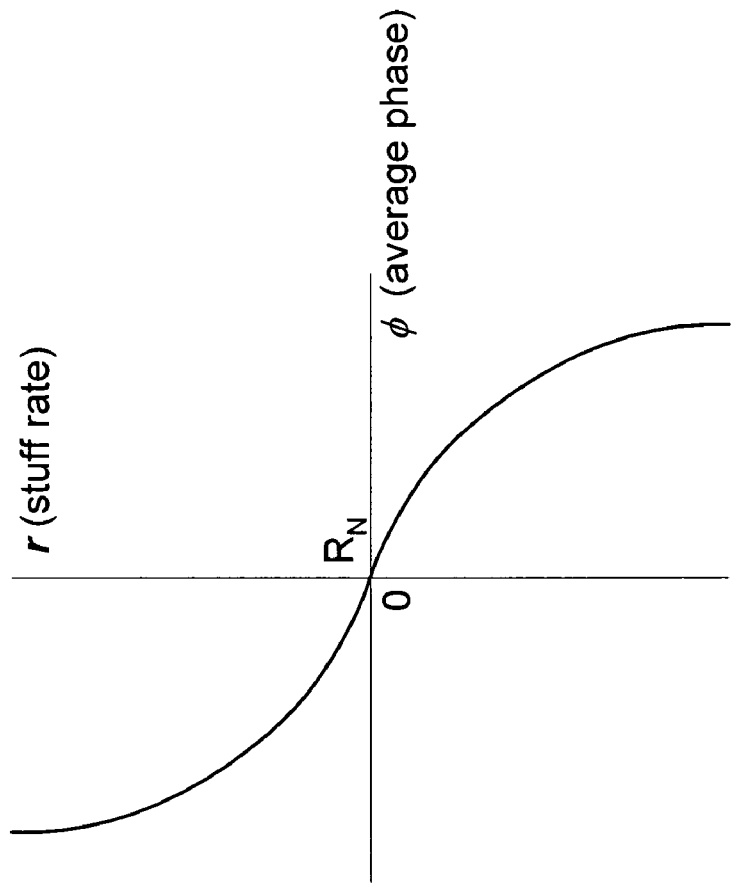
FIG. 5a graphically illustrates one embodiment of a conceptual non-linear stuff rate mapping.

FIG. 5a graphically illustrates one embodiment of a non-linear conceptual stuff rate mapping. The stuff rate, r, is a function of the average phase difference, $\phi$, between the write and read clocks:

$$\phi = \overline{\phi_{write} - \phi_{read}}$$

$$r = f(\phi)$$

The function, $f$ can be of different forms for different characteristics. An example is a piece-wise linear function as depicted in FIG. 5b, the function can be expressed as:

$$r = K_1\phi + R_N \text{ for } \Phi_2 \le \phi \le \Phi_1$$
$$= K_2\phi + R_3 \text{ for } \quad \phi > \Phi_1$$
$$= K_3\phi + R_4 \text{ for } \Phi_2 > \phi$$

where, $R_N$ corresponds to the nominal stuff rate when $\phi$ is 0; $K_1$, $K_2$, $K_3$, $R_3$, $R_4$, $\Phi_1$, and $\Phi_2$ are constants. The stuff rate outside the phase range of $\Phi_1$ and $\Phi_2$ changes more quickly to prevent the underflow or overflow of queue 200.

In general, a half-full queue corresponds to the nominal stuff rate. In one embodiment, the nominal stuff rate is 393.2087 bps for C-bit parity or 1795.918 bps for M23 application; however, other nominal stuff rates can also be used based on the standard applicable to the output signal format. In one embodiment, stuffing is accomplished by inhibiting reads from the queue based on the stuff rate. As the queue fill level (phase value) deviates from the half-full level, the stuff rate changes. The higher the phase value, the lower the stuff rate. The lower the phase value, the higher the stuff rate. The relationship between the queue value and the stuff rate can be linear or nonlinear or a mix of both as illustrated in FIG. 5.

The filtered phase signal is used by stuff rate generator 250 to generate a stuff rate signal that is provided to clock gating circuit 220. In summary, stuff rate generator 250 causes the stuff rate to track the fill level of queue 200. The read clock signal is formed by subtracting the bit stuff rate from the M12 multiplexor clock signal. For example, using C-bit parity, the nominal stuff rate is approximately 400 Hz. Because the nominal stuff rate is relatively low (as compared to the DS1 data rate), the bandwidth requirement for the circuit providing the transmuxing operation is much less than implementations where a full extraction of the DS1 signal is carried out.

Figure 6:
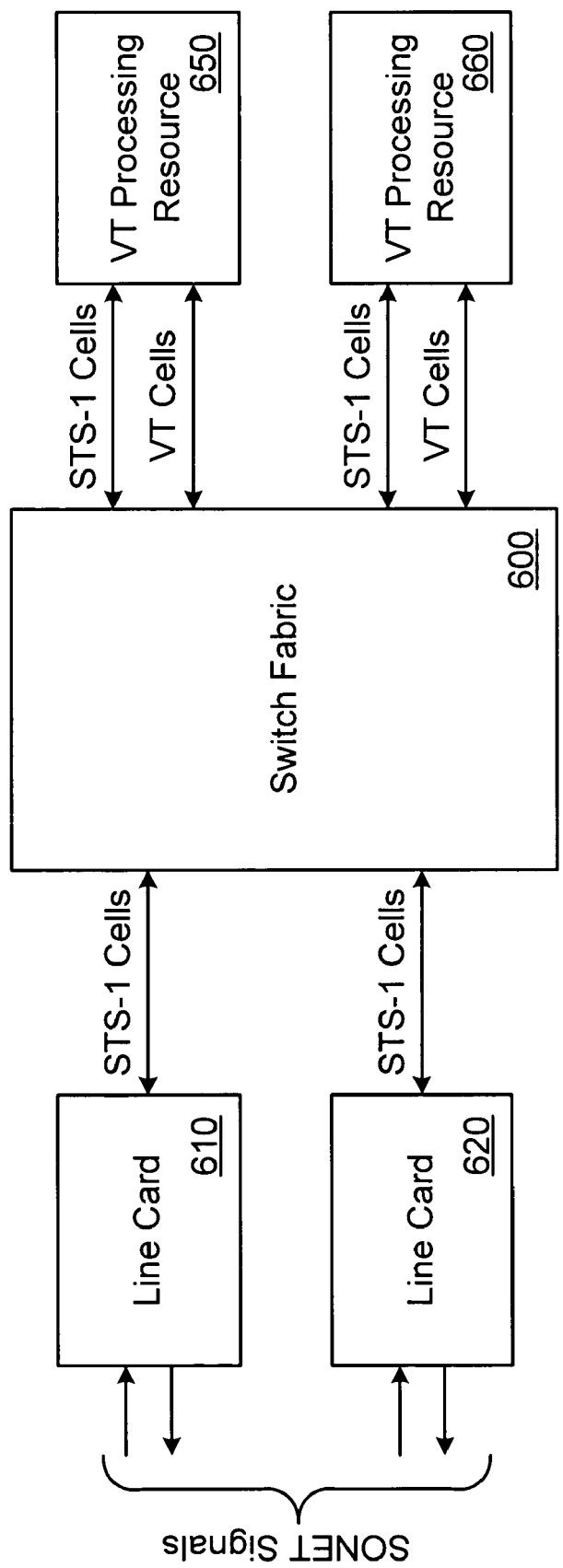
FIG. 6 is a block diagram of one embodiment of a switching architecture having a protocol-independent switch fabric in which transmultiplexing is implemented.

FIG. 6 is a block diagram of one embodiment of a switching architecture having a protocol-independent switch fabric in which transmultiplexing is implemented. The example of FIG. 6 illustrates two processing resources; however, any number of processing resources can be supported. Line cards 610 and 620 include an optical/electrical interface through which optical signals are transmitted and received. In one embodiment, the optical signals are transmitted according to synchronous optical network (SONET) protocols; however, other protocols could also be used.

Line cards 610 and 620 receive optical signals that are transformed to corresponding electrical signals in any manner known in the art. In one embodiment, the electrical signals are STS-level signals, for example, STS-1, STS-3, STS-12, STS-48 or STS-192. In the example of FIG. 6, the signals are STS-1 signals; however, other signals can also be used.

In one embodiment, line cards 610 and 620 convert the optical signals to STS-1 formatted signals to a predetermined microcell format before transmitting the signals over switch fabric 600. In one embodiment, the predetermined format is a fixed-length cell having a predetermined number of bytes (e.g., 64, 80, 128 bytes) and a header. The header can include information such as, for example, source line card, destination line card and/or destination processing device, etc. Thus, line cards 610 and 620 create deterministic streams of microcells (labeled "STS-1 cells" in FIG. 6) that can be switched by switch fabric 600.

The microcells are routed through switch fabric 600 to a destination device identified in the header of the respective microcells. Any switch fabric that can be configured to route the microcells to the desired destination devices can be used. In one embodiment, switch fabric 600 is a protocol-independent, cell-based switch fabric; however, any switch fabric capable of switching data packets having a predetermined format can also be used. The destination devices identified in a header of a microcell can be a line card or a processing resource (e.g., VT processing resources 650 and 660).

If STS-1 level switching is required, switch fabric 600 can perform the required switching by routing the microcells containing STS-1 level traffic to the desired destination line cards. The destination line card then assembles the STS-1 data stream from the incoming microcells. When VT level switching is required, microcells are transmitted to processing resources coupled with switching fabric 600. In the example of FIG. 6, microcells carrying STS-1 traffic to be groomed at the VT level are transmitted to VT processing resource 650 or VT processing resource 660. In one embodiment, the VT processing resources perform VT1.5 grooming; however, other levels of VT grooming (e.g., VT2, VT3, VT6) can also be supported.

The VT processing resources receive microcells carrying STS-1 traffic and extract one or more VT1.5 channels from the STS-1 traffic. The VT processing resources transform the VT level traffic to microcells having the predetermined format described above. The microcells carrying VT level traffic (labeled "VT cells" in FIG. 6) are transmitted by the VT processing resource to a destination VT processing resource. The destination VT processing resource can be the same as the source VT processing resource, or the destination VT processing resource can be a different VT processing resource.

The destination VT processing resource converts data from microcells to VT formatted signals. One or more VT signals are combined to generate STS-1 signals as described above. The STS-1 signals are converted to microcell format to be transmitted to a destination line card. By switching microcells carrying VT level traffic streams, VT level switching can be accomplished with switch fabric 600. Because only microcells carrying STS-1 traffic streams to be switched as the VT level are transmitted to the VT processing resources, the VT processing resources can be efficiently utilized.

Further, because VT microcells are transmitted over switch fabric 600, multiple VT processing resources can interact to provide VT level switching, which allows VT processing resources to be added as necessary to provide an efficient, non-blocking switch architecture. The STS-1 signals from the VT processing resources are converted to microcells and transmitted across switch fabric 600 to the appropriate destination line card.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method for transmultiplexing a data stream carried on a synchronous network so that the data stream can be carried on a plesiochronous network, comprising:
    extracting data from a data stream carried on a synchronous network and formatted according to a synchronous network protocol;
    storing the extracted data in a buffer based on a first timing signal associated with the data stream;
    reading the extracted data from the buffer based on a second timing signal associated with a plesiochronous network protocol;
    generating a phase difference signal corresponding to a phase difference between the first timing signal and the second timing signal;
    filtering the phase difference signal in a synchronous domain; and
    generating stuff bits for a data stream according to the plesiochronous network protocol based on at least a piece-wise linear function of a phase difference between the first timing signal and the second timing signal; and
    transmitting the data stream according to the plesiochronous network protocol onto the plesiochronous network.

2. The method of claim 1 further comprising formatting the extracted data and the stuff bits as a data stream according to the plesiochronous network protocol.

3. The method of claim 2 wherein the data stream according to the plesiochronous network protocol comprises a DS1 data stream.

4. The method of claim 1 wherein the synchronous network protocol comprises a synchronous optical network (SONET) protocol.

5. The method of claim 1 wherein the data stream formatted according to the first network protocol comprises a VT1.5 formatted data stream.

6. The method of claim 5 wherein the first timing signal comprises a clock signal for the VT1.5 formatted data stream.

7. The method of claim 1 wherein the first timing signal and the second timing signal have approximately the same average frequency.

8. The method of claim 1 wherein the buffer comprises a first-in/first-out (FIFO) queue.

9. An apparatus comprising:
    a buffer to store data extracted from a data stream formatted according to a synchronous network protocol, wherein the extracted data is stored in the buffer in response to a first timing signal associated with the data stream and the extracted data is read from the buffer in response to a second timing signal associated with a plesiochronous network protocol;
    a phase detector coupled to receive the first timing signal and the second timing signal to determine a phase difference between the first timing signal and the second timing signal and to generate a phase difference signal;
    a filter coupled to sample the phase difference signal in response to the first timing signal and to generate a phase metric signal based on the sampled phase difference signal and to filter the phase metric signal in a synchronous domain; and
    a stuff rate generator coupled to receive the filtered phase metric signal to generate a stuff rate signal based on the filtered phase metric signal, wherein a relationship between the filtered phase metric signal and the stuff rate signal is piece-wise linear.

10. The apparatus of claim 9 wherein the phase metric comprises an average number of data values stored in the buffer.

11. The apparatus of claim 9 wherein the synchronous network protocol comprises a synchronous optical network (SONET) protocol.

12. The apparatus of claim 11 wherein the data stream formatted according to the synchronous network protocol comprises a VT1.5 formatted data stream.

13. The apparatus of claim 9 wherein the extracted data is formatted according to the plesiochronous network protocol and comprises a DS1 data stream.

14. The apparatus of claim 9 wherein the first timing signal and the second timing signal have approximately the same average frequency.

15. A system comprising:

a switch fabric;

a buffer to store data extracted from a data stream formatted according to a synchronous network protocol, wherein the extracted data is stored in the buffer in response to a first timing signal associated with the data stream and the extracted data is read from the buffer in response to a second timing signal associated with a plesiochronous network protocol;

a phase detector coupled to receive the first timing signal and the second timing signal to determine a phase difference between the first timing signal and the second timing signal and to generate a phase difference signal;

a filter coupled to sample the phase difference signal in response to the first timing signal and to generate a phase metric signal based on the phase difference signal and to filter the phase metric signal in a synchronous domain; and a stuff rate generator coupled to receive the filtered phase metric signal to generate a stuff rate signal based on the filtered phase metric signal, wherein a relationship between the filtered phase metric signal and the stuff rate signal is piece-wise linear.

16. The system of claim 15 wherein the phase metric comprises an average number of data values stored in the buffer.

17. The system of claim 15 wherein the data stream formatted according to the synchronous network protocol comprises a VT1.5 formatted data stream.

18. The system of claim 15 wherein the extracted data is formatted according to the plesiochronous network protocol and comprises a DS1 data stream.

19. An apparatus comprising:

means for extracting data from a data stream formatted according to a synchronous network protocol;

means for storing the extracted data in a buffer based on a first timing signal associated with the data stream;

means for reading the extracted data from the buffer based on a second timing signal associated with a plesiochronous network protocol;

means for generating a phase difference signal corresponding to a phase difference between the first timing signal and the second timing signal;

means for filtering the phase difference signal in a synchronous domain; and means for generating stuff bits for a data stream according to the plesiochronous network protocol based on at least a piece-wise linear function of a phase difference between the first timing signal and the second timing signal.

20. The apparatus of claim 19 further comprising means for formatting the extracted data and the stuff bits as a data stream according to the plesiochronous network protocol.

* * * * *